(No Model.)
G. BEEBE.
TWO WHEELED VEHICLE.
No. 407,715. Patented July 23, 1889.
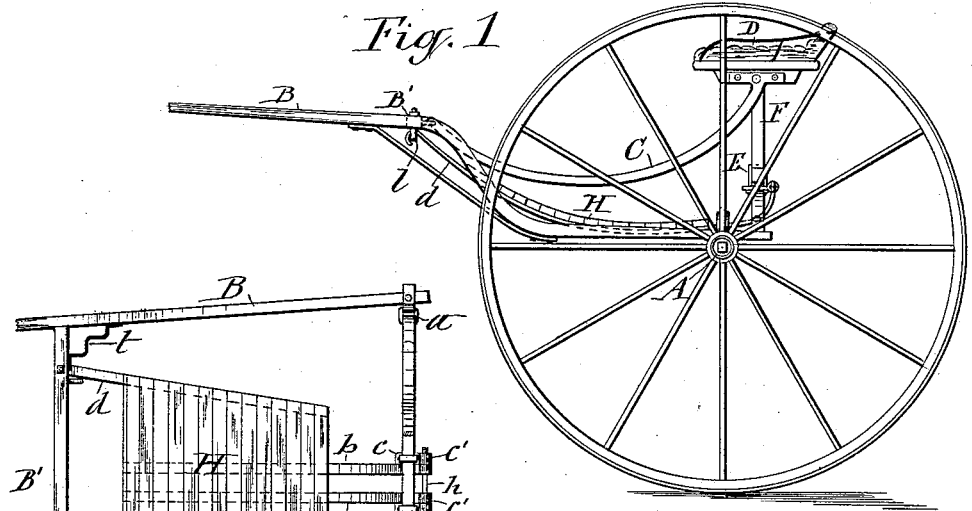
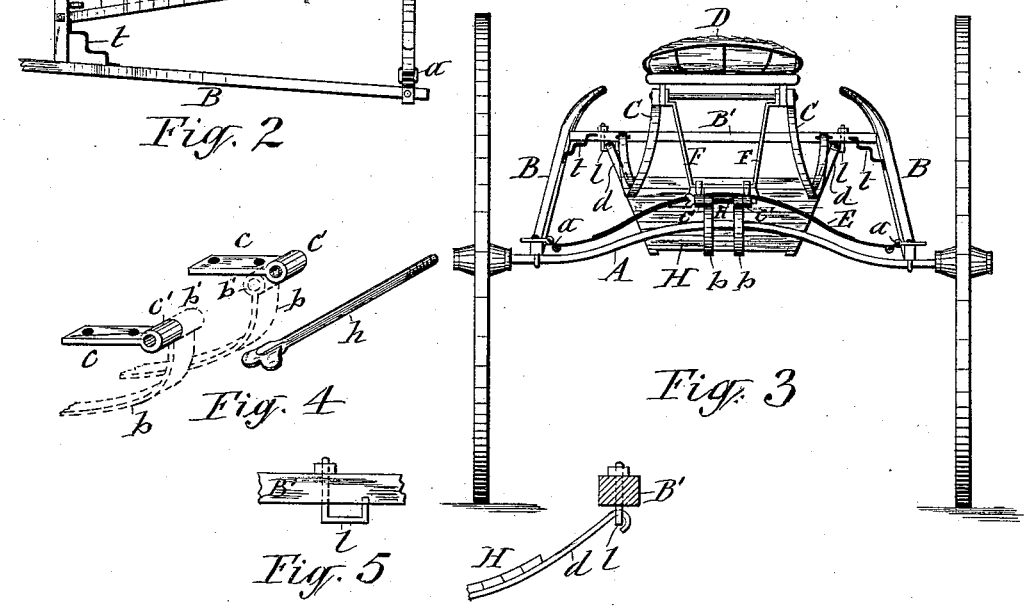
WITNESSES:
C. L. Bendixon
Mark W. Dewey
INVENTOR:
George Beebe
BY
Duell, Laass & Duell
ATTORNEYS

UNITED STATES PATENT OFFICE.

GEORGE BEEBE, OF PENN YAN, NEW YORK, ASSIGNOR TO WILLIAM M. BEEBE, OF SAME PLACE.

TWO-WHEELED VEHICLE.

SPECIFICATION forming part of Letters Patent No. 407,715, dated July 23, 1889.

Application filed April 8, 1889. Serial No. 306,351. (No model.)

*To all whom it may concern:*

Be it known that I, GEORGE BEEBE, of Penn Yan, in the county of Yates, in the State of New York, have invented new and useful Improvements in Two-Wheeled Vehicles, of which the following, taken in connection with the accompanying drawings, is a full, clear, and exact description.

This invention relates to the class of two-wheeled vehicles usually designated "road-carts."

The object of this invention is to convert such vehicles into speeding-sulkies; and to that end the invention consists, essentially, in the combination, with the cart, of stirrups permanently fixed thereto and a foot-board detachably connected thereto, so that by the removal of said foot-board the aforesaid stirrups can be used in the same manner as those usually connected to sulkies.

In the annexed drawings, Figure 1 is a side view of a two-wheeled vehicle embodying my improvements. Fig. 2 is a plan view of the foot-board and its attachment. Fig. 3 is a rear end view of the vehicle. Fig. 4 is a detached perspective view of the device for connecting the rear end of the foot-board to the vehicle, and Figs. 5 and 6 are detail views of the front attachment of the foot-board.

A represents the axle of the vehicle; B, the shaft or thills, which I rigidly secure to the axle. B' designates the usual cross-bar, which unites the two thills. D denotes the seat, which is mounted on the spring E by a bracket or standard F, said spring being hung on the rear ends of the shafts by means of shackles $a$.

Braces C C are attached at one end to opposite sides of the seat and at the opposite ends to the cross-bar B' of the thills.

The general construction of the vehicle is similar to that illustrated in my prior patent, No. 383,207, dated May 22, 1888, and inasmuch as the detail construction of the vehicle is immaterial to my present invention, it is unnecessary to further describe the construction thereof.

My present invention pertains to the detachable connection of the foot-board H to the aforesaid vehicle.

The clip-ties $c$ $c$, by which the standard F is secured to the spring E, are formed with rearwardly-projecting shackle-eyes $c'$ $c'$, which are axially in line with each other, and to the cross-bar B' of the shafts are attached loops $l$ $l$, standing in planes parallel with the said cross-bar.

The foot-board H is provided with rearwardly-extending arms $b$ $b$, which terminate with shackle-eyes $b'$, which are a proper distance apart to come close to the inner sides of the shackle-eyes $c'$ $c'$, and are axially in line with the same. One of the shackle-eyes $c'$ is screw-threaded internally, and through the four shackle-eyes passes a thumb-bolt $h$, which is screw-threaded at one end and engages the screw-threaded shackle-eye aforesaid.

From the front end of the foot-board are extended forward two arms $d$ $d$, which pass with their extremities through the loops $l$ $l$, and are preferably bent downward in front of the said loops, as shown in Fig. 6 of the drawings. The foot-board is readily detached from the vehicle by simply removing the thumb-bolt $h$ and lowering the rear end of the foot-board, and then drawing it rearward to withdraw the front arms $d$ $d$ from the loops $l$ $l$.

To the shafts B B, I permanently attach suitable stirrups $t$ $t$, similar to those connected to sulkies.

Having described my invention, what I claim as new, and desire to secure by Letters Patent, is—

1. In a two-wheeled vehicle, the foot-board provided at one end with shackle-eyes and at the opposite end with supporting-arms, in combination with shackle-eyes on the vehicle coinciding with those of the foot-board, a single bolt inserted removably through the aforesaid shackle-eyes and supporting one end of the foot-board, and loops attached to the vehicle and receiving through them the aforesaid supporting-arms of the foot-board, all constructed and combined to allow the foot-board to be removed by the withdrawal of the aforesaid single bolt, substantially as set forth.

2. The combination of the shafts and seat-supporting cross-spring, clip-ties on said spring formed with shackle-eyes, which latter are axially in line with each other, loops on the cross-bar of the shafts, the foot-board provided with forwardly-extending arms passing through the aforesaid loops, and rearwardly-extended arms terminating with shackle-eyes close to the sides of and axially in range with the shackle-eyes of the aforesaid clip-ties, and a single bolt inserted in said shackle-eyes and removably connecting the foot-board to the vehicle, substantially as described and shown.

3. The combination of the shafts and seat-supporting cross-spring, clip-ties on said spring formed with shackle-eyes, which latter are axially in line with each other, and one of said latter eyes screw-threaded internally, loops on the cross-bar of the shafts, the foot-board provided with rearwardly-extended arms terminating with shackle-eyes close to the inner sides of and in range with the shackle-eyes of the aforesaid clip-ties, a single bolt, screw-threaded at one end, passing through the aforesaid shackle-eyes and engaging the screw-threaded eye, and arms extending forward from the foot-board and through the aforesaid loops and removable therefrom, substantially as described and shown.

In testimony whereof I have hereunto signed my name this 5th day of April, 1889.

GEORGE BEEBE. [L. S.]

Witnesses:
 A. CLINTON BROOKS,
 DELOS A. BELLIS.